Aug. 11, 1959   C. BOEGLE   2,898,739
HYDRAULIC COUPLING
Filed May 1, 1956

Inventor
CHARLES BOEGLE
Paul M. Craig, Jr.
Attorney

United States Patent Office 2,898,739
Patented Aug. 11, 1959

2,898,739

HYDRAULIC COUPLING

Charles Boegle, Claye-Souilly, France, assignor to Societe Anonyme Procedes Sauter, Paris, France, a corporation of France Application May 1, 1956, Serial No. 581,937

Claims priority, application France May 6, 1955

14 Claims. (Cl. 60—54)

The present invention relates to an hydraulic transmission for effectively coupling an input or driving shaft to an output or driven shaft, and more particularly to an hydraulic coupling for coupling a motor shaft to the load shaft, such as spinning shaft, of a wash machine in such a manner as to provide a very progressive coupling and to enable slippage as soon as abnormal resistance is developed.

Accordingly, it is an object of the present invention to provide a hydraulic coupling for connecting an input shaft to a load shaft, such as of a wash machine, which permits a gradual rate of acceleration of the ouput shaft and which also provides for slippage between the two shafts as soon as abnormal loads or resistances develop in the output shaft.

Another object of the present invention is to provide such an arrangement of an adjustable hydraulic coupling as enables the use of a relatively light apparatus of relatively small dimension and great compactness while maintaining a sturdy construction which is characterized by its extreme structural simplicity.

A further object of the present invention resides in the provision of an hydraulic coupling for use in a wash machine which is reliable in operation, offers ease of control thereof and is relatively inexpensive to manufacture.

Another object of the present invention lies in the provision of an hydraulic coupling which may be readily assembled and disassembled thereby facilitating installation and repairs, and in which all parts are readily accessible to reduce cost in connection with maintenance and repairs.

Still another object of the present invention resides in the provision of an hydraulic coupling for coupling the motor shaft with the load shaft of a wash machine in which means are provided for readily engaging and disengaging the hydraulic coupling.

Figure 1:
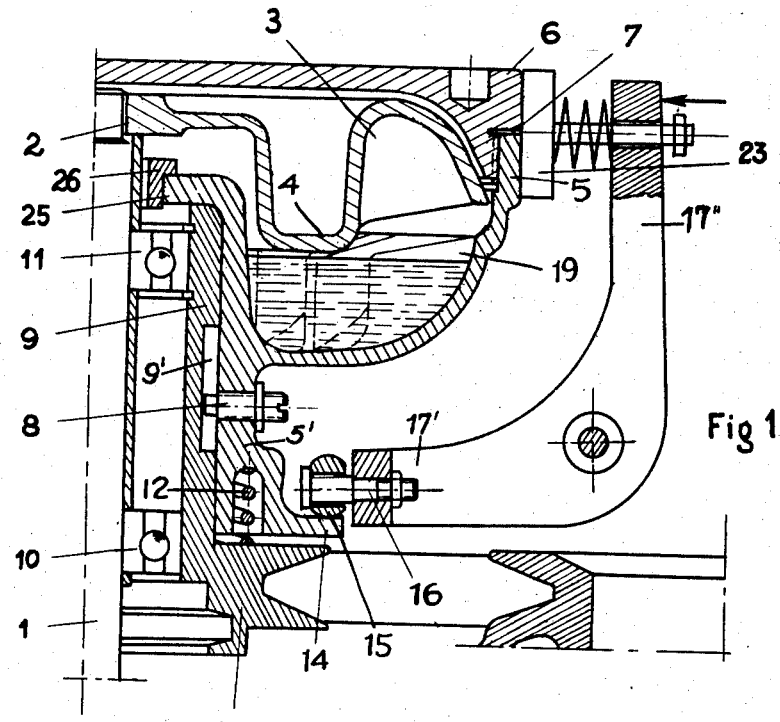
Figure 2:
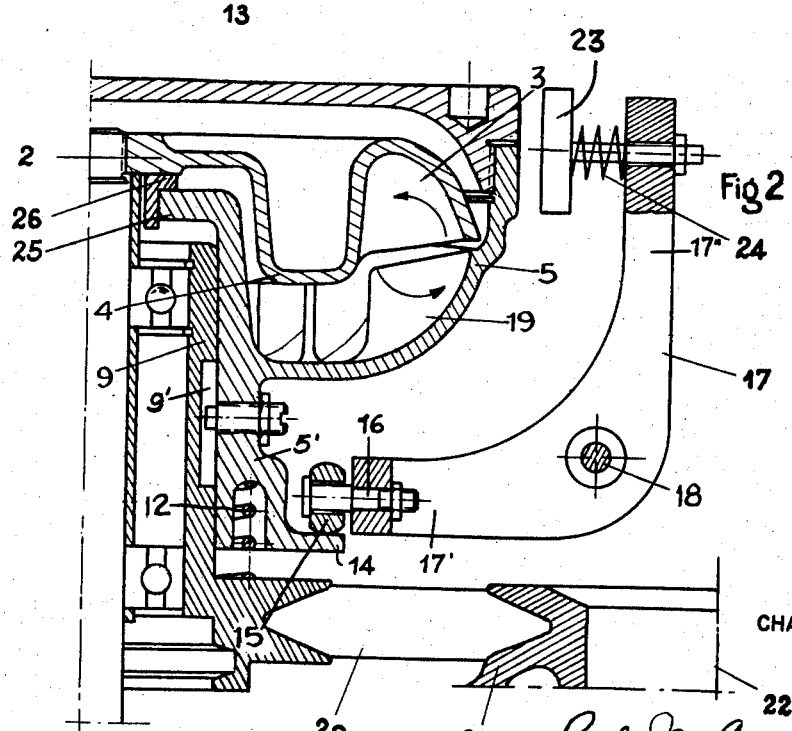

Further objects, features and advantages of the present invention will become more obvious from the following description when taken in connection with the accompanying drawing which shows, for purposes of illustration only, one embodiment in accordance with the present invention, and wherein:

Figure 1 is a partial vertical cross sectional view of an hydraulic coupling in accordance with the present invention passing through the axis of the motor shaft and showing the coupling in its disengaged position, and Figure 2 is a partial vertical cross sectional view similar to Figure 1 but showing the hydraulic coupling in the engaged position thereof.

Hydraulic couplings exhibit operating characteristics which render the same particularly useful for purposes of coupling the motor or driving shaft of a wash machine to the load or output shaft thereof since a gradual entrainment, i.e., a gradual rate of acceleration of the load shaft is made possible thereby while at the same time the maximum ultimate speed of the load shaft depends on the amount of slippage which is a function of the friction and resistance developed at the output shaft. Moreover, as soon as unusual resistances develop at the output shaft the slippage automatically increases thereby reducing the speed of the output or load shaft.

The present invention essentially consists of an hydraulic coupling for coupling an output or load shaft with an essentially vertical motor driven input shaft which comprises a first rotor member mounted freely rotatable on the motor shaft and formed integral with the load shaft, an annular trough-like reservoir portion which is formed by the first-mentioned rotor member disposed about the motor shaft and containing a certain quantity of fluid, a plurality of vanes or blades disposed essentially radially in the interior of the annular trough-shaped portion and forming part of the first rotor member, a second rotor member integrally connected at an angle with the motor shaft and provided with a second series of vanes or blades disposed essentially radially opposite the first series of vanes or blades, the rotor members being able to be displaced one with respect to the other along the motor shaft under the action of a control member either to place the second-mentioned blades or vanes in contact with the liquid in the trough-shaped portion to thereby obtain the entrainment of the first rotor member and of the output shaft by the intermediary of the liquid or to mutually disengage the first and second-mentioned vanes or blades sufficiently to thereby disengage the coupling and therewith the output shaft from the input shaft.

Referring now more particularly to the drawing wherein like reference numerals are used throughout the various views to designate like parts, reference numeral 1 designates the motor or input shaft which is disposed essentially vertically and which is driven in any suitable manner. The motor shaft 1 is surrounded by a hollow shaft 9 which is coaxial therewith and which may freely rotate about the motor shaft 1 by means of the interposition of two roller bearings 10 and 11.

The first rotor member 5 which is formed integrally with a collar 5' coaxially disposed to the hollow shaft 9 is mounted over the hollow shaft 9 by means of the collar 5'. The first rotor member 5 is secured for common rotation with the hollow shaft by a set screw or key 8 or the like extending through the collar 5'. The key 8 is so constructed as to be able to be displaced in a longitudinal groove or keyway 9' formed in the hollow shaft 9 to enable a relative displacement in the vertical or axial directions between the first rotor member 5 and the hollow shaft 9 while assuring common rotation of these two elements.

The rotor member 5 forms an annular trough shaped reservoir portion which is partially filled with a liquid, such as oil, and which is closed at the upper part thereof by a cover 6 and a fluid-tight joint 7 interposed between the cover 6 and the upper part of the rotor member 5 to thereby provide a fluid-tight housing for the hydraulic coupling. The fluid-tight joint 7 may be formed in any conventional manner. The vanes or blades 19, which are disposed essentially radially, are formed integral or are rigidly secured to the rotor member 5 and are disposed in the bottom of the trough-shaped portion along the periphery thereof so as to provide a space in the center or inner portion of the trough-shaped reservoir which is free of any obstructions inclusive blades or vanes 19.

The second rotor member 2 which is disposed within the housing of the hydraulic coupling is mounted on the upper part of the motor shaft 1 and is rigidly connected therewith or formed integrally therewith in any suitable manner to provide common rotation therewith. The second rotor member 2 is disposed in the interior of the annular trough-shaped portion formed by the rotor member 5 and comprises along the periphery thereof vanes or blades 3 which are arranged radially opposite the vanes or blades 19 to define therebetween the liquid circuits of the hydraulic coupling. The rotor member 2 also comprises an annular protruding portion 4 which is so shaped as to form an annular channel which extends with the bottom walls thereof into the annular space which is left free at the bottom of the trough-shaped portion formed in the member 5 when the rotor member 5 is in the position illustrated in Figure 2 in which the bottom of the trough-shaped portion thereof approaches the annular protruding portion 4.

The quantity of fluid, such as oil, in the trough-shaped portion of the rotor member 5 is so determined and chosen that its level is slightly below the bottom of the protruding portion 4 when the protruding portion 4 is disposed at a relatively greater distance from the bottom of the trough-shaped portion in the position of the rotor member 5 represented in Figure 1, in which the latter is in its lower position.

The lower portion of the hollow shaft 9 is integral with the pulley 13 which is connected in any suitable manner such as by means of a belt 20 with a pulley 21 formed integral or rigidly connected with the axis 22 of an output shaft (not illustrated). One of the outer radial surfaces of the pulley 13 forms at the same time a shoulder at the lower part of the hollow shaft 9 against which abuts the spring 12 which is located within an appropriate recess in collar 5' and which supports the rotor member 5, 5' on the lower part of the hollow shaft 9 so as to constantly urge the rotor member 5 upwardly into the position illustrated in Figure 2.

The position of the rotor member 5 along the shaft 9 is controlled by a roller member 15 which is in contact with a shoulder 14 formed integrally with the collar 5' of the rotor member 5 and projecting radially from the lower portion thereof which surrounds the shaft 9. The roller member 15 enables the exertion of a pressure on the shoulder 14 in such a manner as to more or less compress the spring 12. The roller member 15 is movable about a shaft or pin 16 which is mounted at one end of an arm 17' of the double armed angle lever 17 which is pivotally supported about a horizontal axis 18.

The other arm 17'' of the angle lever 17 comprises at the end thereof a brake adapted to brake or stop the rotor member 5 when the arm 17' carrying the roller member 15 is lowered, i.e., rotated counter-clockwise. The brake is formed by brake shoe 23 mounted on a pin which extends essentially horizontally and which is slidably mounted at the end of the arm portion 17'' of the lever 17. The shoe 23 is disposed opposite a cylindrical portion of the rotor member 5 and a spring 24 interposed between the arm 17'' and the brake shoe 23 urges the brake shoe 23 against the cylindrical portion of the rotor member 5 when the roller member 15 is in its lower position, as illustrated in Figure 1.

The cylindrical collar portion 5' of the rotor member 5 by means of which the same is mounted over the shaft 9 is provided at the upper end thereof with a flange 25 extending radially inwardly, through which the motor shaft 1 extends. This flange 25 limits the longitudinal axial movement of the rotor member 5 by abutting in the lower position of the rotor member 5 (Fig. 1) against the upper extremity of the hollow shaft 9, and in its upper position against the rotor member 2 by means of an intermediate annular member 26 mounted on the flange 25 and formed so as to be able to slip with respect to the rotor member 2.

Operation

The operation of the coupling arrangement according to my invention is as follows:

If pressure is exerted in the direction of the arrow on the upper part 17'' of the angle lever 17, as shown in Figure 1, then the brake shoe 23 of the brake abuts against the rotor 5 which itself is in its lower position due to the counter-clockwise rotation of angle lever 17 and the engagement between roller member 15 and shoulder 14.

The rotor member 2 which constitutes the impeller continues to turn since it is connected to the motor shaft 1 but its protruding portion 4 is located above the level of the liquid in the trough-shaped reservoir portion of the rotor member 5 (Fig. 1). It follows therefrom that the level of the liquid remains below the upper edges of the blades or vanes 19 of the rotor member 5 which constitutes the runner. Consequently, there is no contact between the blades 3 of the rotor member 2 and the liquid. As a result thereof the rotor member 5 remains stationary, stopped also by the brake shoe 23.

In order to obtain the entrainment, i.e., gradual acceleration of the rotor member 5 and of the pulley 21, the pressure exerted on the upper portion 17'' of the angle lever 17 is released. As shown in Figure 2, the spring 12 lifts the rotor member 5 up to the upper position thereof and simultaneously therewith disengages also the brake shoe 23 due to the clockwise rotation of angle lever 17. The protruding portion 4 of the rotor member 2 thereby projects into and enters the liquid and, as a result thereof, raises the level of the liquid to reach the blades 3 of the rotor member 2 which provides a viscous rubbing action and the beginning of a very progressive acceleration of the rotor member 5. As a result of the centrifugal force, the liquid is displaced outwardly toward the outer part of the trough-shaped portion, the wall of which is inclined. This action combines with that of the protruding portion 4 to project the liquid against the blades 3 of the rotor member 2 and does so the more quickly the greater the speed of the rotor member 5 becomes. The acceleration of the rotor member 5 therefore increases in this manner until the maximum speed thereof is attained which is determined by the speed of the motor shaft 1 and the slippage in the coupling. When the rotor member 5 is at full speed, the liquid circulates between the blades 3 and 19 as indicated by the arrows in Figure 2 and the interaction provided thereby maintains the engagement.

In order to stop or release the coupling, it suffices to compress the spring 12 by applying again a force to the arm 17'', as described hereinabove. The distance between the blades 3 and 19 increases, the torque transmitted between the rotor members decreases, the movement of the rotor member 5 slows down, and with the circumferential speed decreasing, the oil redescends and progressively abandons the blades. This movement is aided by the brake which is actuated at the same time as the roller member 15 abuts more and more against the shoulder 14, while the rotor member is displaced downwardly away from the protruding portion 4.

I claim:

1. An hydraulic coupling with an hydraulic medium for connecting an input shaft with an output shaft comprising a first rotor member operatively connected with said input shaft, a second rotor member operatively connected with said output shaft, said first rotor member and said second rotor member having generally vertical axes, said first rotor member overlying said second rotor member, and said second rotor member when at rest containing said hydraulic medium, means enabling relative axial movement of one of said rotor members with respect to the corresponding shaft, spring means for axially biasing said second rotor member towards said first rotor member, a pluality of vanes in each of said rotor members disposed opposite one another, and means for selectively engaging and disengaging said hydraulic coupling by axially moving one of said rotor members relative to the other under the influence of said spring means including means connected with said first rotor member for raising the liquid level of said hydraulic medium to a level at which said medium contacts said vanes in both of said rotor members.

2. An hydraulic coupling with an hydraulic medium for connecting an input shaft with an output shaft comprising a first rotor member operatively connected with one of said shafts, a second rotor member operatively connected with the other of said shafts, said first rotor member and said second rotor member having generally vertical axes, said first rotor member overlying said second rotor member, said second rotor member when at rest containing said hydraulic medium, means enabling relative axial movement of one of said rotor members with respect to the corresponding shaft and to said other rotor member, a plurality of vanes in each of said rotor members disposed opposite one another to be coupled by said hydraulic medium, and means for selectively engaging and disengaging said hydraulic coupling by moving one of said rotor members relative to the other, said last-mentioned means including a portion provided in said first rotor member and protruding in the direction of said second rotor member to such an extent that in the disengaged position of said coupling the level of said hydraulic medium in said second rotor member is slightly below the edges of the vanes of said second rotor member and said protruding portion lies essentially above said level, while in the engaged position of said coupling, said protruding portion extends into said hydraulic medium thereby raising the level thereof by the displacement of said medium by said protruding portion and effecting hydraulic medium contact with the said vanes in both said rotor members.

3. An hydraulic coupling with an hydraulic medium for connecting an input shaft with an output shaft comprising a first rotor member operatively connected with one of said shafts, a second rotor member operatively connected with the other of said shafts, said first rotor member and said second rotor member having substantially vertical axes, said first rotor member overlying said second rotor member, said second rotor member when at rest containing said hydraulic medium at a level below the vanes of said first rotor member, means enabling relative axial movement of one of said rotor members with respect to the corresponding shaft, a plurality of vanes in each of said rotor members disposed opposite one another, and means for selectively engaging and disengaging said hydraulic coupling including means on said first rotor member for changing the level of said hydraulic medium upon the occurrence of said relative axial movement so as to provide fluid engagement by said medium with all of said vanes in the engaged position of said coupling.

4. An hydraulic coupling according to claim 3, wherein said second rotor member is formed with a reservoir for containing said hydraulic medium, said reservoir having an essentially level bottom and inclined peripheral walls to enhance interaction between said vanes by raising the level of said medium along said walls by the centrifugal forces resulting from the rotation of at least one of said rotor members.

5. In an hydraulic coupling for connecting an input shaft with an output shaft comprising input shaft means, a hollow output shaft rotatably supported on said input shaft means, a first rotor member operatively connected with said input shaft means, a second rotor member opposite said first rotor member, said first rotor member and said second rotor member being rotatable about generally upwardly extending axes, said first rotor member overlying said second rotor member, means connecting said second rotor member with said hollow shaft to enable axial relative movements between said second rotor member and said hollow shaft while providing common rotation therebetween, each of said rotor members being provided with a plurality of radially extending blades disposed in the respective rotor members opposite each other, said second rotor member providing a trough-shaped portion free of blades, a liquid filling said second rotor member to such an extent that in the disengaged position of said coupling the upper edges of the blades of said second rotor member extend beyond the liquid level, said first rotor member being provided with an annular projection opposite said trough-shaped portion to displace the liquid therein upon raising said second rotor member, and means for raising and lowering said second rotor member whereby the liquid level is raised upon immersion of the annular protruding portion of said first rotor member into the liquid to thereby provide gradual acceleration of the second rotor member by said first rotor member.

6. In an hydraulic coupling for connecting an input shaft with an output shaft comprising input shaft means, a hollow output shaft rotatably supported on said input shaft means, a first rotor member operatively connected with said input shaft means, a second rotor member opposite said first rotor member, said first and second rotor members being rotatable about substantially vertical axes, said first rotor member overlying said second rotor member, means connecting said second rotor member with said hollow shaft to enable relative axial movements between said second rotor member and said hollow shaft while providing common rotation therebetween, each of said rotor members being provided with a plurality of radially extending blades disposed in the respective rotor members opposite each other, said second rotor member forming a trough-shaped portion free of blades, a liquid filling said second rotor member to such an extent that in the disengaged position of said coupling the upper edges of the blades of said second rotor member extend beyond the liquid level, said first rotor member being provided with an annular projection opposite said trough-shaped portion to displace the liquid therein upon raising said second rotor member, means for raising and lowering said second rotor member whereby the liquid level is raised upon immersion of the annular protruding portion of said first rotor member into the liquid to thereby provide gradual acceleration of said second rotor member by said first rotor member, and brake means in operative engagement with said second rotor member to simultaneously apply a braking force thereto upon lowering the second rotor member for purposes of disengaging said hydraulic coupling.

7. In an hydraulic coupling for connecting an input shaft with an output shaft comprising input shaft means, a hollow output shaft rotatably supported on said input shaft means, a first rotor member operatively connected with said input shaft means, a second rotor member opposite said first rotor member, said first and second rotor members being rotatable about generally vertical axes, said first rotor member overlying said second rotor member, means connecting said second rotor member with said hollow shaft to enable relative axial movements between said second rotor member and said hollow shaft while providing common rotation therebetween, each of said rotor members being provided with a plurality of radially extending blades disposed in the respective rotor members opposite each other, said second rotor member forming a trough-shaped portion free of blades, a liquid filling said second rotor member to such an extent that in the disengaged position of said coupling the upper edges of the blades of said second rotor member extend beyond the liquid level, said first rotor member being provided with an annular projection opposite said trough-shaped portion to displace the liquid therein upon raising said second rotor member, and means for raising and lowering said second rotor member whereby the liquid level is raised upon immersion of the annular protruding portion of said first rotor member into the liquid to thereby provide gradual acceleration of the second rotor member by said first rotor member, said last-named means including an angle lever having a roller means mounted on one arm thereof operatively engaging said second rotor member to move the same in an axial direction upon actuation of said angle lever.

8. In an hydraulic coupling for connecting the input motor-driven shaft with the output shaft of a wash machine comprising input shaft means, a hollow output shaft rotatably supported on said input shaft means, a first rotor member rotatably supported about a generally vertical axis and operatively connected with said input shaft means, a second rotor member opposite and underlying said first rotor member, means connecting said second rotor member with said hollow shaft to enable relative axial movements between said second rotor member and said hollow shaft while providing common rotation therebetween, each of said rotor members being provided with a plurality of radially extending blades disposed in the respective rotor members opposite each other, said second rotor member forming a central trough-shaped portion free of blades, a liquid filling said second rotor member to such an extent that in the disengaged position of said coupling the upper edges of said blades of said second rotor member extend beyond the liquid level, said first rotor member being provided with an annular projection opposite said trough-shaped portion to displace the liquid therein upon raising said second rotor member, means for raising and lowering said second rotor member whereby the liquid level is raised upon immersion of the annular protruding portion of said first rotor member into the liquid to thereby provide gradual acceleration of the second rotor member by said first rotor member, said last-named means including an angle lever having roller means mounted on one arm thereof operatively engaging said second rotor member to move the same in the axial direction upon actuation of said angle lever, and brake means mounted at the other arm of said angle lever in operative engagement with said second rotor member to simultaneously apply a braking force thereto upon lowering said second rotor member for purposes of disengaging said hydraulic coupling.

9. In an hydraulic coupling for connecting an input shaft with an output shaft comprising input shaft means, a hollow output shaft rotatably supported on said input shaft means, a first rotor member operatively connected with said input shaft means for common rotation therewith about a vertical axis, a second rotor member coaxially disposed beneath and opposite said first rotor member, means connecting said second rotor member with said hollow shaft to enable axial relative movements between said second rotor member and said hollow shaft while providing common rotation therebetween, each of said rotor members being provided with a plurality of radially extending blades disposed in the respective rotor members opposite each other, said second rotor member forming a trough-shaped portion free of blades with a flat bottom and inclined peripheral walls, a liquid filling said second rotor member to such an extent that in the disengaged position of said coupling the upper edges of the blades of said second rotor member protrude beyond the liquid level, said first rotor member being provided with an annular projection opposite said trough-shaped portion to displace the liquid therein upon raising said second rotor member, means for raising and lowering said second rotor member whereby the liquid level is raised upon immersion of said annular protruding portion of said first rotor member into the liquid to thereby provide gradual acceleration of said second rotor member by said first rotor member, and spring means normally urging said second rotor member into engaged position.

10. In an hydraulic coupling the combination according to claim 5 wherein said second rotor member is provided with an essentially horizontal bottom and includes radial walls to enhance engagement between said blades due to the centrifugal forces resulting from rotation of the hydraulic coupling.

11. In an hydraulic coupling an input shaft, an hollow output shaft, bearing means for mounting said output shaft over said input shaft, a first rotor member disposed for rotation about a vertical axis and provided with radially extending vanes, means for securing said first rotor member to said input shaft, a second rotor member having radially extending vanes disposed opposite and beneath said first-mentioned vanes and having a collar portion surrounding said hollow output shaft, means for securing said collar portion to said hollow shaft to enable relative vertical axial movement therebetween while providing common rotation of said hollow shaft with said collar portion, a cover connected with said second rotor member in fluid-tight relation to provide a housing within which said first rotor member is disposed, said hollow shaft being provided with an abutment surface along the lower end thereof, and spring means intermediate said abutment surface and said collar portion to normally urge said second rotor member in the direction of said first rotor member to provide operative engagement of said hydraulic coupling by establishing fluid circuits by said vanes for the hydraulic medium of said coupling, and means for disengaging said hydraulic coupling by moving said second rotor member away from said first rotor member in opposition to said spring pressure.

12. In an hydraulic coupling the combination according to claim 11 wherein said second rotor member includes an inwardly extending flange portion intermediate the end of said hollow shaft adjacent said first rotor member and said first rotor member to limit the movement of said second rotor member.

13. A hydraulic coupling with a hydraulic medium for connecting an input shaft with an output shaft comprising a first rotor member operatively connected with said input shaft, a second rotor member operatively connected with said output shaft, vanes on said first rotor member, vanes on said second rotor member, said output shaft, said first rotor member and said second rotor member having generally vertical axes, said first rotor member overlying said second rotor member, said second rotor member being provided with a reservoir, said hydraulic medium being contained within said reservoir when said second rotor member is at rest, one of said rotor members being provided with means to cause axial movement of said one of said rotor members toward the other of said rotor members, said first rotor member being provided with projecting means, said projecting means prior to said axial movement being spaced from said hydraulic medium and after occurrence of said axial movement being immersed in said hydraulic medium and causing said hydraulic medium to coact with the said vanes on said first rotor member and said vanes on said second rotor member for establishing a force-transmitting relationship between said first rotor member and said second rotor member.

14. In a hydraulic coupling with a hydraulic medium and having a first rotor member operatively connected to a vertical input shaft and a second rotor member having an operative connection to a vertical output shaft, said first rotor member overlying said second rotor member, said second rotor member having a reservoir, said hydraulic medium when said second rotor member is at rest being wholly contained within said reservoir, means for causing axial movement of one of said rotor members toward the other of said rotor members, first vanes on said first rotor member and second vanes on said second rotor member; means projecting from said first rotor member for causing a displacement of said hydraulic medium into contact with said first vanes, said projecting means becoming immersed in said hydraulic medium upon occurrence of said axial movement.

References Cited in the file of this patent

UNITED STATES PATENTS

| | | |
|---|---|---|
| 2,417,964 | Becker | Mar. 25, 1947 |
| 2,533,544 | Zavarella | Dec. 12, 1950 |
| 2,544,713 | Miller | Mar. 13, 1951 |
| 2,665,553 | Foster et al. | Jan. 12, 1954 |
| 2,700,538 | Anderson | Jan. 25, 1955 |
| 2,723,737 | Hammell et al. | Nov. 15, 1955 |